US006819470B2

(12) United States Patent
Meier et al.

(10) Patent No.: US 6,819,470 B2
(45) Date of Patent: Nov. 16, 2004

(54) HIDDEN HINGE DIGITAL MICROMIRROR DEVICE WITH IMPROVED MANUFACTURING YIELD AND IMPROVED CONTRAST RATIO

(75) Inventors: Robert E. Meier, Dallas, TX (US); James D. Huffman, Richardson, TX (US)

(73) Assignee: Texas Instruments Incorporated, Dallas, TX (US)

( * ) Notice: Subject to any disclaimer, the term of this patent is extended or adjusted under 35 U.S.C. 154(b) by 0 days.

(21) Appl. No.: 10/359,754

(22) Filed: Feb. 6, 2003

(65) Prior Publication Data

US 2003/0117688 A1 Jun. 26, 2003

Related U.S. Application Data

(63) Continuation of application No. 09/967,043, filed on Sep. 28, 2001, now Pat. No. 6,522,454.
(60) Provisional application No. 60/236,954, filed on Sep. 29, 2000.

(51) Int. Cl.[7] .......................... G02B 26/00; G02B 26/08
(52) U.S. Cl. ...................................... 359/291; 359/198
(58) Field of Search ................................ 359/198, 214, 359/223–225, 290, 291, 295, 298, 900

(56) References Cited

U.S. PATENT DOCUMENTS

| 5,083,857 | A |   | 1/1992 | Hornbeck ..................... 359/291 |
| 5,485,304 | A | * | 1/1996 | Kaeriyama ................... 359/291 |
| 5,535,047 | A |   | 7/1996 | Hornbeck ..................... 359/295 |
| 5,600,383 | A |   | 2/1997 | Hornbeck ..................... 348/771 |
| 5,640,479 | A |   | 6/1997 | Hegg et al. ................... 385/120 |
| 5,771,116 | A |   | 6/1998 | Miller et al. ................. 359/295 |
| 5,867,202 | A | * | 2/1999 | Knipe et al. ................. 347/239 |
| 2002/0012744 | A1 |   | 1/2002 | Miller et al. .................. 427/58 |

* cited by examiner

Primary Examiner—Georgia Epps
Assistant Examiner—William Choi
(74) Attorney, Agent, or Firm—Charles A. Brill; Wade James Brady, III; Frederick J. Telecky, Jr.

(57) ABSTRACT

An improved DMD type spatial light modulator having an array of pixels (18). The pixels (18) are of the "hidden hinge" design, each pixel having a mirror (30) supported over a hinged yoke (32). Addressing electrodes (26, 28) on an underlying metallization layer and addressing electrodes (50, 52) at the yoke level provide electrostatic forces that cause the mirrors to tilt and then to return to their flat state. The pixels (18) are designed to provide increased clearance between the leading edge of the yoke (32) and the underlying metallization layer when the mirrors (30) are tilted. Various features of the improved pixel (18) also improve the contrast ratio of images generated by the DMD.

8 Claims, 6 Drawing Sheets

HIDDEN HINGE DIGITAL MICROMIRROR DEVICE WITH IMPROVED MANUFACTURING YIELD AND IMPROVED CONTRAST RATIO

This application is a Continuation of application Ser. No. 09/967,043, filed Sep. 28, 2001, now U.S. Pat. No. 6,522,454, and provisional application Ser. No. 60/238,954, filed Sep. 29, 2000.

TECHNICAL FIELD OF THE INVENTION

This invention relates to spatial light modulators, and more particularly to a digital micro mirror device.

BACKGROUND OF THE INVENTION

Spatial light modulators (SLMs) have found numerous applications in the areas of optical information processing, projection displays, video and graphics monitors, televisions, and electrophotographic printing. SLMs are devices that modulate incident light in a spatial pattern to form an image corresponding to an electrical or optical input. The incident light may be modulated in phase, intensity, polarization, or direction.

An SLM is typically comprised of an area or linear array of addressable picture elements (pixels). Source pixel data is first processed by an associated control circuit, then loaded into the pixel array, one frame at a time.

One type of SLM is the digital micro mirror device (DMD)™ developed by Texas Instruments Incorporated. The DMD is a monolithic single chip circuit, having a high density array of 16 micron square moveable micromirrors on 17 micron centers. These mirrors are fabricated over address circuitry which has SRAM cells and address electrodes. Each mirror forms one pixel and is bistable, such that light directed upon the mirror will be reflected in one of two directions. For display applications, in an "on" mirror position, light is reflected to a projector lens and focused on a display screen. In the "off" position, light is deflected to a light absorber. The array of "on" and "off" pixels produces an image.

More detailed discussions of the DMD device and its use may be found in the following patents: U.S. Pat. Nos. 5,061,049; 5,079,544; 5,105,369; and 5,278,652. Each of these patents is assigned to Texas Instruments Incorporated.

The evolution and design variations of the DMD can be appreciated through a reading of several patents, also assigned to Texas Instruments Incorporated.

The "first generation" of DMD spatial light modulators implemented a deflectable mirror/beam. An electrostatic force was created between the mirror and the underlying address electrode to induce deflection of the mirror. The mirror was supported by torsion hinges and axially rotated one of two directions. In the bistable mode, the mirror tips land upon a landing pad. The following patents describe this first generation of DMDs: U.S. Pat. Nos. 4,662,746; 4,710,732; 4,956,619; and 5,172,262.

The "second generation" DMD has a mirror that is elevated above a yoke. The yoke is suspended over the addressing circuitry by torsion hinges. An electrostatic force is generated between the elevated mirror and an elevated electrode. The mirror and the yoke rotate, but it is the yoke that comes into contact with a landing electrode. The following patents describe this second generation of DMDs: U.S. Pat. Nos. 5,083,857; 5,600,383; and 5,535,047.

SUMMARY OF THE INVENTION

One aspect of the invention is a DMD type spatial light modulator fabricated on a substrate. The substrate contains memory and control circuitry for addressing the pixels of the DMD. Each pixel has addressing circuitry comprising a first portion that is proximate the substrate and a second portion elevated above the substrate. In one embodiment, the first portion of the addressing circuitry has electrodes on a metallization layer, and the second portion has electrodes at an elevated yoke layer. A yoke is supported over the addressing circuitry first portion. At least one hinge is connected to the yoke and supports the yoke. The hinge permits tilting of the yoke in response to electrostatic addressing. A mirror is elevated above and supported by the yoke, and is mirror positioned over the elevated addressing circuitry second portion.

At each leading edge of the yoke, a pair of springtips are operable to land on the addressing circuitry first portion. The spacing between the springtips of each springtip pair, the length of the springtips, and the height of the yoke are increased for "optimal performance". This optimal performance provides greater clearance between the addressing circuitry first portion and the leading edge of the yoke without significant comprise to the electrostatic performance.

As explained in further detail below, one advantage of the invention is that it reduces the likelihood of shorting between the yoke and the underlying metallization layer when the mirror is fully landed on the metallization layer. Additional features of the pixel improve the contrast ratio of images generated by the DMD mirror array.

DETAILED DESCRIPTION OF THE INVENTION

The following description describes various modifications to a spatial light modulator of the type manufactured by Texas Instruments Incorporated. In particular, the modifications are to a "hidden hinge" type digital micromirror device (DMD).

As explained in the Background, the basic design of the DMD that is the subject of this description is sometimes referred to as the "hidden hinge" DMD because its pixel have their mirrors elevated over a yoke. The "second generation" U.S. Patents referenced in the Background describe various aspects of the hidden hinge DMD and are incorporated by reference herein.

Figure 1:
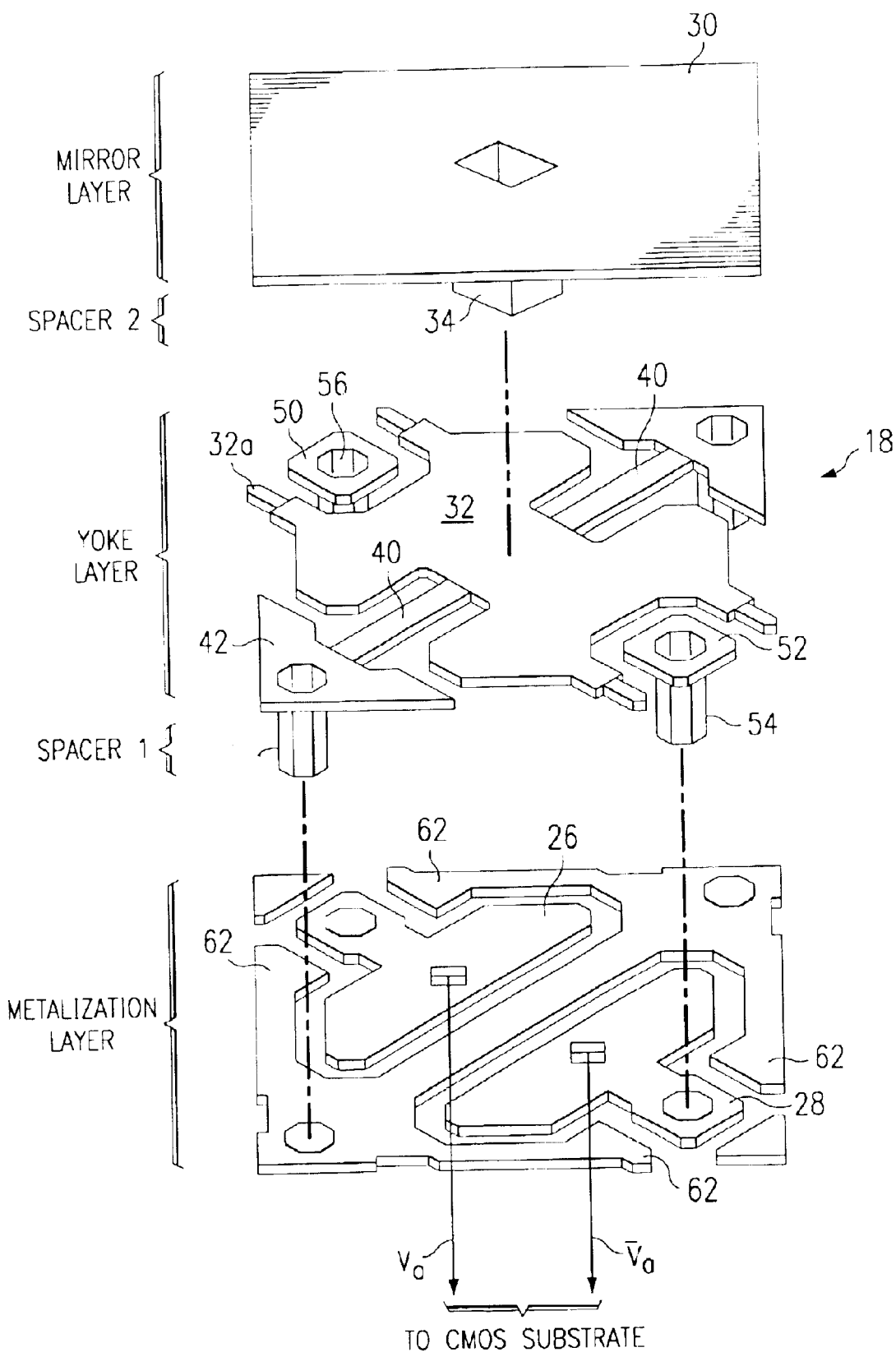
FIG. 1 is an exploded view of a single pixel of a DMD array in accordance with the invention.

FIG. 1 is an exploded view of a single pixel 18 of a DMD array in accordance with the invention. An underlying CMOS substrate having memory and control circuitry is not shown.

The array of pixels 18 can be thought of as having five layers fabricated over the CMOS substrate. Beginning at the bottom, these layers are a metallization layer, a first spacer layer, a yoke layer, a second spacer layer, and a mirror layer.

In the example of this description, the overall dimensions of pixel 18 are approximately 16 microns in area and 3 microns in height. The pixels 18 of the DMD array are on approximately 17 micron centers. Various dimensions are given herein consistent with this example pixel for purposes of illustration relative proportions of various structural elements. However, it should be understood, that pixels could be fabricated in a range of other sizes.

For each pixel 18, the data of an associated memory cell is provided to a pair of complementary address electrode lines, each line in turn being connected to one of two address electrodes 26 and 28. Pixel 18 has a square mirror 30 supported upon and elevated above a yoke 32 by a support post 34. Support post 34 extends downward from the center of mirror 30, and is attached to the center of yoke 32. Yoke 32 has a generally butterfly shape and is axially supported along a center axis by a pair of torsion hinges 40. One end of each torsion hinge 40 is attached to and supported by a hinge support cap 42 on top of a hinge support post 44. A pair of elevated address electrodes 50 and 52 are supported by address electrode support posts 54 and 56.

The address support posts 54 and 56 and the hinge support posts 44 support the mirror address electrodes 50 and 52, the torsion hinges 40, and yoke 32 away from and above a bias/reset bus 60 and address electrodes 26 and 28. When mirror 30 and yoke 32 are rotated about the torsion axis of the yoke 32, a pair of springtips 32a, which protrude from the leading edge of the yoke 32 that is deflected, land upon the bias/reset bus 60 at landing sites 62. The "leading edge" of yoke 32 is the portion of yoke 32 that comes closest to the metallization layer when mirror 30 is tilted and springtips 32a are landed.

The pixel 18 of FIG. 1 and of the following description has its addressing circuitry on two levels. Some of the addressing circuitry is fabricated on the metallization layer, such as electrodes 26 and 28. Other portions of the addressing circuitry are fabricated as part of the yoke layer, such as the mirror address electrodes 50 and 52.

FIGS. 2A–4B illustrate the yoke layer and metallization layer in further detail. Each of these figure pairs (A and B) illustrates, in comparison to other DMD versions, one or more structural modifications to pixel 18 that improve the DMD's manufacturability or performance, or both. In each figure pair, a layer or element of the new pixel 18 is compared to an "other" pixel 100 of another DMD version. For purposes of comparison, analogous elements are numbered with like reference numerals, even though the elements are not exactly the same.

Figure 2A:
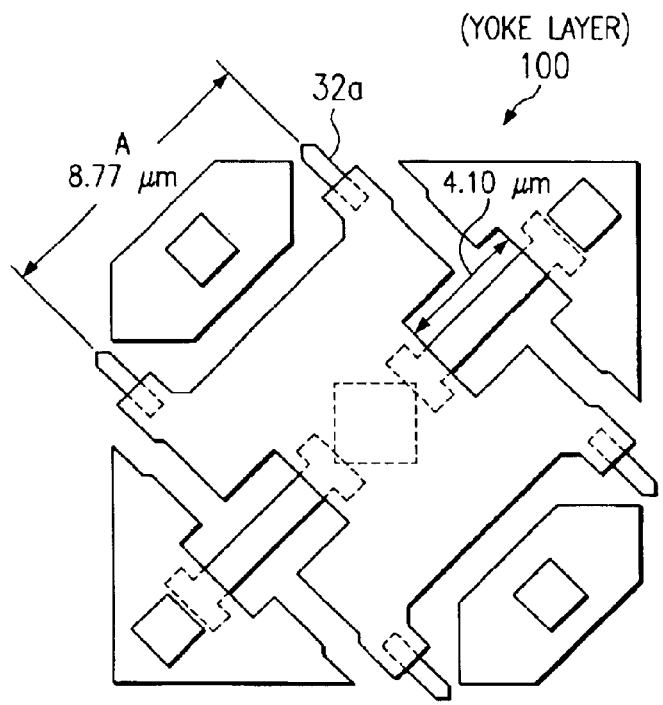
FIGS. 2A and 2B illustrate an "old" and a "new" version of the yoke layer, respectively.
Figure 2B:
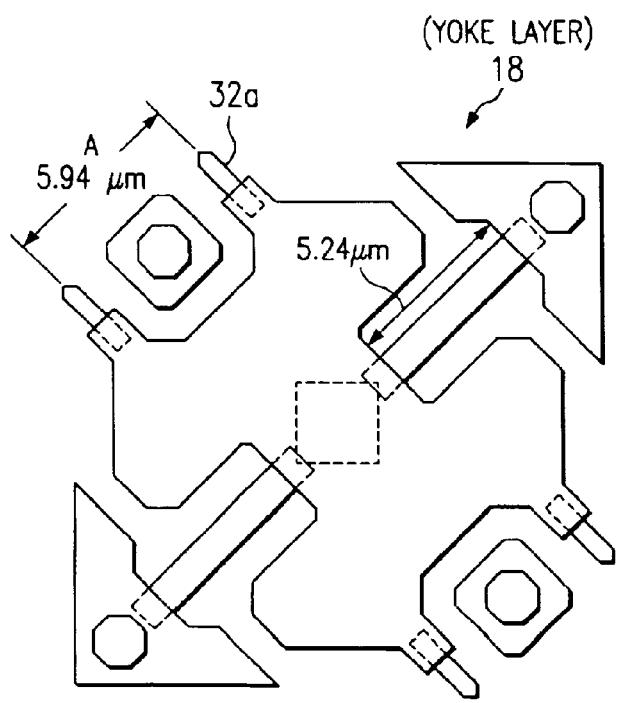

More specifically, FIGS. 2A and 2B illustrate yoke layer, with FIG. 2B being in accordance with the invention. As illustrated by dimension A, the springtips 32a of the new pixel 18 are closer together than those of the other (old) pixel 100. In the example of FIGS. 2A and 2B, the new pixel 18 has a springtip centerline-to-centerline spacing of 5.94 microns, whereas the other pixel 100 has a springtip centerline-to-centerline spacing of 8.77 microns.

Figure 3A:
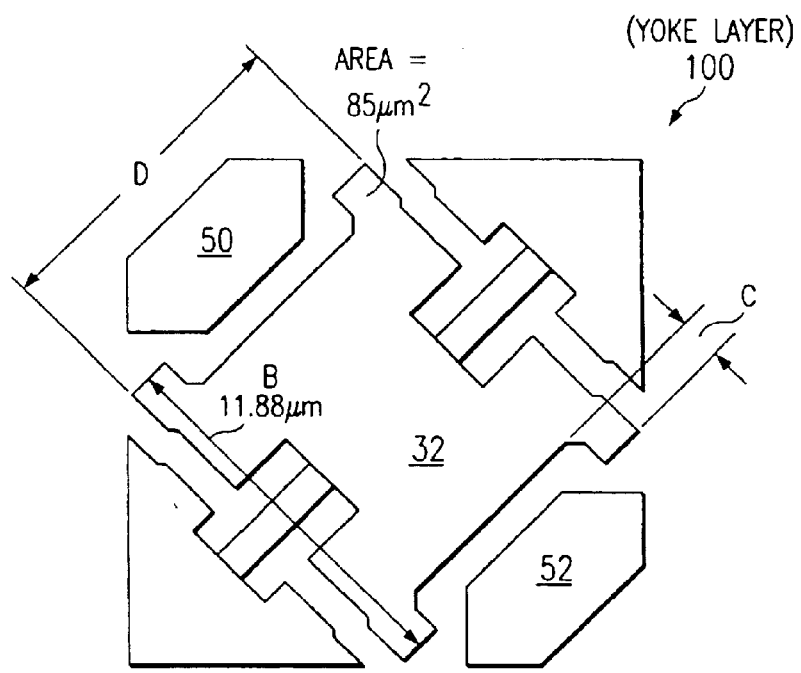
FIGS. 3A and 3B are a second illustration of the "old" and the "new" version of the yoke layer.
Figure 3B:
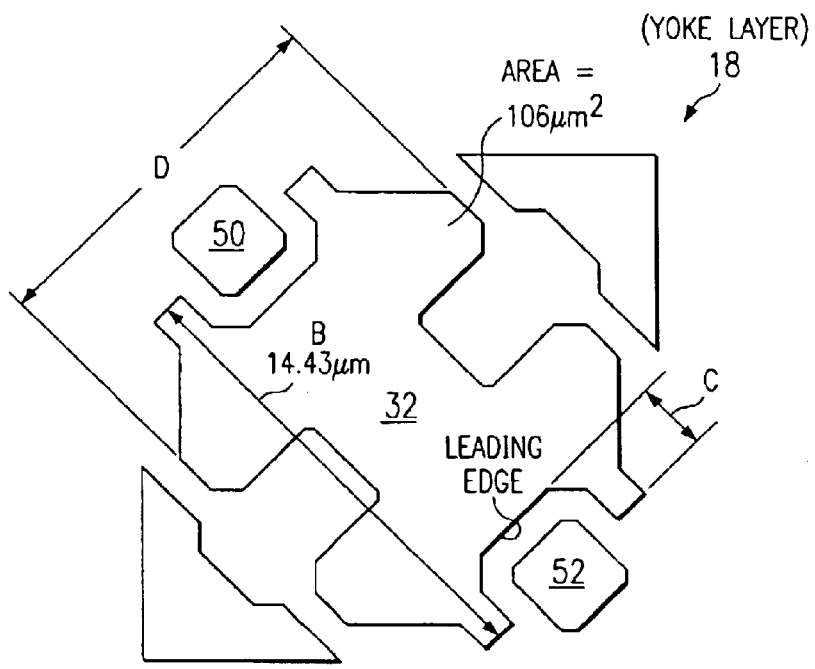

Referring now to FIGS. 3A and 3B, as illustrated by dimension B, the springtips 32a are extended further into the corner of the overlying mirror 30. This is achieved by lengthening the span on yoke 32 between the bases of opposing springtips 32a. In the example of FIGS. 3A and 3B, the new pixel 18 has a yoke length of 11.88 microns, whereas the other pixel 100 has a length of 14.43 microns.

The two modifications illustrated by dimensions A and B increase the clearance between yoke 32 and the underlying metallization layer when yoke 32 is tilted toward the underlying metallization layer. During operation, yoke 32 is electrostatically active, and increasing this clearance lessens the likelihood that stray particles will cause shorting between the leading edge of yoke 32 and the underlying metallization layer.

Referring to FIG. 1, another modification, motivated by achieving the desired tile angle, is increasing the height of the spacer 1 layer. This height, and thus the air gap under yoke 32, is increased from 1.18 microns to 1.40 microns.

FIGS. 3A and 3B further illustrate an increase to dimension C, the span between the base of springtip 32a and the leading edge of yoke 32. This modification further increases the above-described yoke-to-metallization clearance. Another modification is to dimension D, the width of yoke 32 along its leading edge. Increasing the width of the leading edge intensifies electrostatics of operation of the DMD so as to achieve the desired clearance without compromising electrostatic performance. As a result of these modifications, the top surface area of yoke 32 is increased from 85 microns square to 106 microns square.

The above-described modifications result in a doubling of the worst case clearance between the leading edge of yoke 32 and the metallization layer. This is accomplished without significant comprise to the operation robustness of the DMD which might otherwise result from degraded electrostatics. In the example of this description, the estimated worst case clearance is increased from 0.22 microns to 0.44 microns. A significant number of stray particles that could cause shorting are smaller than this clearance dimension. In this manner, the above described dimensions are "optimized" in the sense that they provide increased clearance without significantly compromising electrostatic performance.

Figure 4A:
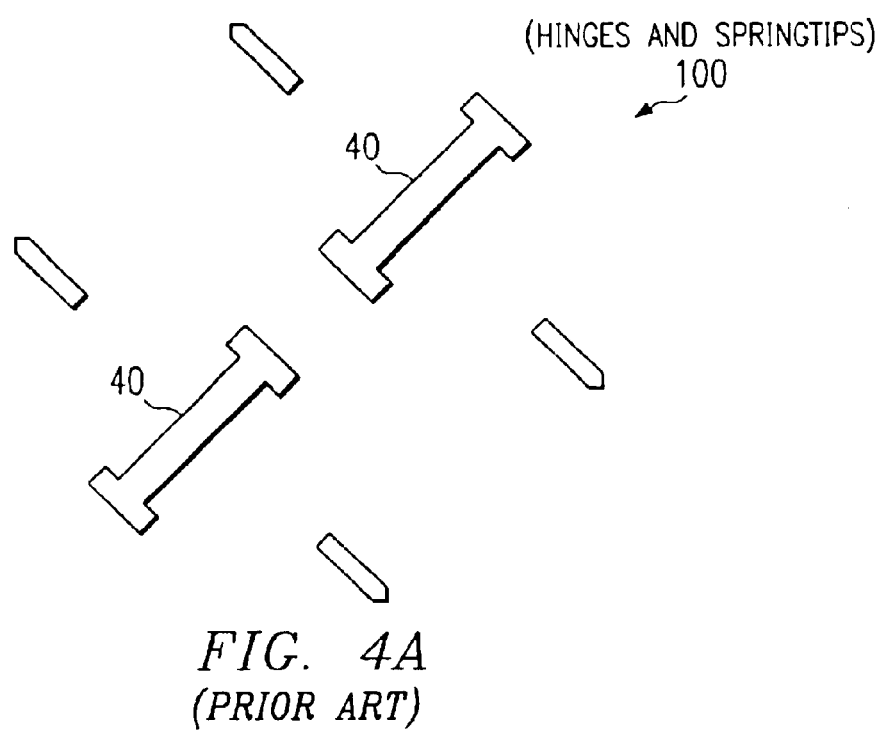
FIGS. 4A and 4B illustrate an "old" and a "new" version of the hinge.
Figure 4B:
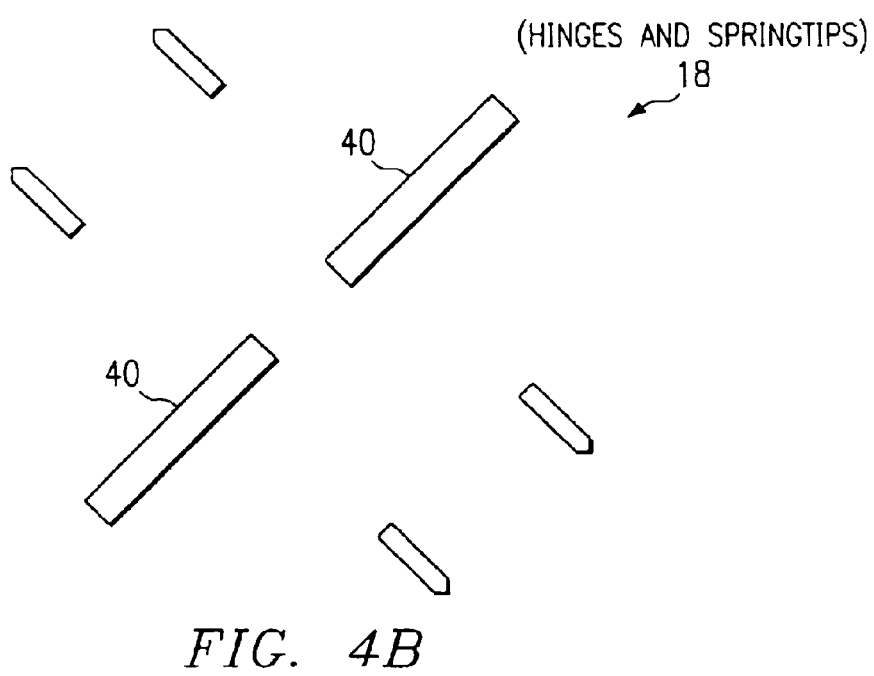

As illustrated in FIGS. 4A and 4B, the hinges 40 have been modified from a "dogbone" shape to a straight "bar" shape. Referring again to FIGS. 1, 2A, and 2B, these figures further illustrate a modification to the hinge support posts 44. In the new pixel 18, the hinge post vias, and hence the resulting hinge posts 44 are round rather than square. These hinge modifications provide a longer hinge and improve contrast ratio. In the example this description, illustrated in FIGS. 2A and 2B, the effective length of hinges 40 is increased from 4.1 microns to 5.24 microns.

FIGS. 3A and 3B further illustrate a modification to the mirror electrodes 50 and 52. In the new pixel 18, these electrodes 50 and 52 have been reduced in size. This improves the contrast ratio of images generated by the DMD during operation, as well as permits the springtips 32a to be moved farther into the mirror corners as described above.

Figure 5A:
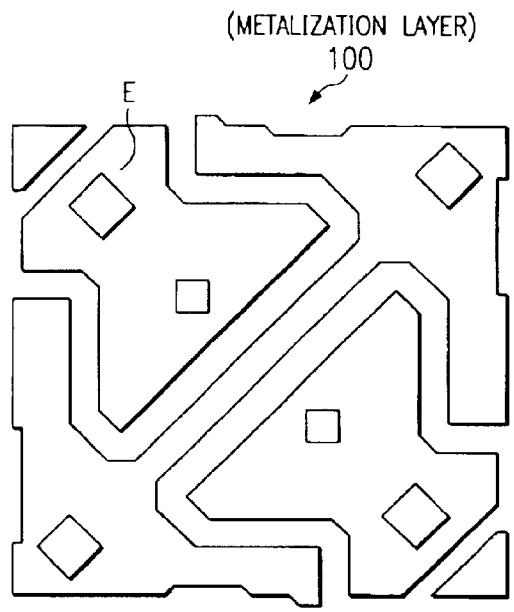
FIGS. 5A and 5B illustrate an "old" and a "new" version of the metallization layer.
Figure 5B:
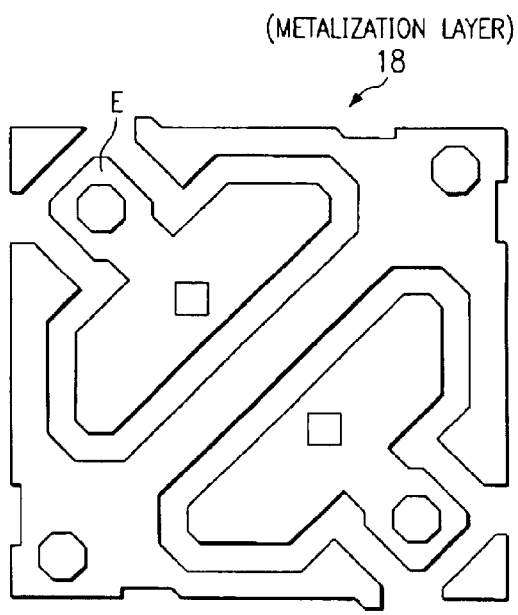

FIGS. 5A and 5B illustrate another modification that improves contrast ratio. As illustrated by the arrow E, the metal under the mirror electrodes 50 and 52 has been reduced. The reduction of metal, both from the mirror electrodes 50 and 52 and of the metal under them, results in less unwanted reflection in the mirror gap corners. More specifically, when mirror 30 is tilted away from a corner of pixel 18, light that enters this corner is reflected less.

Experimentation has shown that the above-described modifications (decreasing the size of the mirror electrodes and the metal under them) provide a significant boost to the contrast ratio. An improved contrast ratio by a factor of 1.5 has been measured as compared to the same pixel without these modifications.

FIGS. 6–11 illustrate the fabrication process performed to fabricate the DMD. The fabrication of one pixel of the array is illustrated. As explained below, the process incorporate various semiconductor fabrication techniques.

Figure 6:
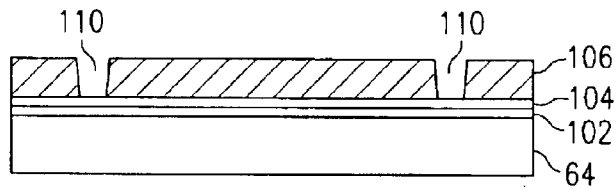
FIGS. 6–11 illustrate the process of fabricating the DMD.

In FIG. 6, a silicon substrate 64 is processed so as to form the underlying address circuitry. This circuitry includes an array of memory cells 16, row address circuitry 20, and column data loading circuitry 30. Thereafter, substrate 64 is covered with a protective oxide layer 102. Next, a metallization layer 104, sometimes referred to as "metal three", is deposited. This metallization layer 104 is patterned and etched to define address electrodes 26 and 28, as well as bias/reset bus 60.

Next, a hinge spacer layer 106 is deposited over the metallization layer. This spacer layer 106 may be positive photoresist. As stated above, one of the features of pixel 18 is an increased air gap under the yoke 32 to 1.18 microns, which dictates the thickness of spacer layer 106. A pair of vias 110 are opened through the photoresist layer 106 to facilitate forming the hinge support posts 44.

Figure 7:
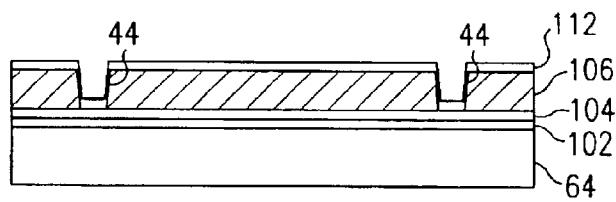

Referring to FIG. 7, a thin hinge layer 112 of metallization is deposited over the photoresist layer 106 and into vias 110. Hinge layer 112 preferably has a thickness of about 500 angstroms and can be comprised of aluminum, aluminum alloys, titanium tungsten, or other conductive metals. The hinge support posts 44 are defined in this step, and are electrically connected to bias/reset bus 60. Also, during this step, the pair of electrode support posts 54 and 56 are defined, whereby the layer 112 is deposited in a pair of vias formed in photoresist 106, these vias having been formed during the previous step when vias 110 were opened. Thus, the electrode support posts and the hinge support posts are similar. The thickness of the photoresist spacer layer 106 determines the hinge air gap, and thus determines the mirror rotation angle due to the angular freedom of yoke 32 until it engages the landing electrodes.

Figure 8:
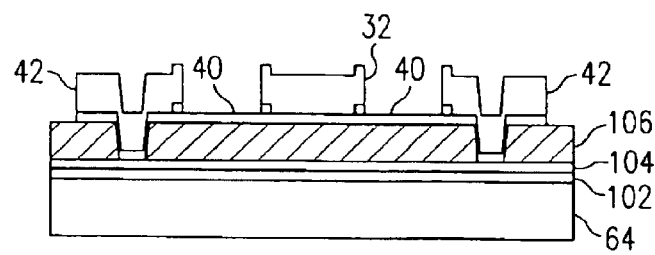

Referring now to FIG. 8, a first mask of oxide is deposited and patterned in the shape of hinges 40. Then, a thick metal layer, typically about 3000 angstroms, of aluminum alloy is deposited. A second mask of oxide is deposited and then patterned in the shape of yoke 32, the elevated electrodes 54 and 56, and the hinge support caps 42. The hinge layer 112 and the thicker metal layer are then etched to define the mirror address electrodes 50 and 52, the hinge support caps 42, and the hinges 40. The two oxide layers act as etch stops and protect the metal layers beneath them. After completion of the etch process, the oxide etch stops are removed from the hinges, the support post caps 42, the electrodes 50 and 54, and the hinges 40.

Figure 9:
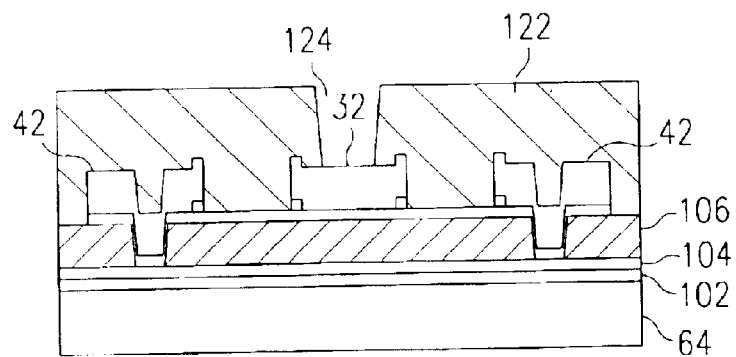

Referring to FIG. 9, a thick mirror spacer layer 122 is deposited over the hinges, electrodes, and hinge support caps, and preferably comprises positive photoresist having a thickness of approximately 2 microns. A via 124 is opened in this photoresist spacer layer 122 to provide an opening above yoke 32, to provide an opening above yoke 32. Then the layer of photoresist is hardened.

Figure 10:
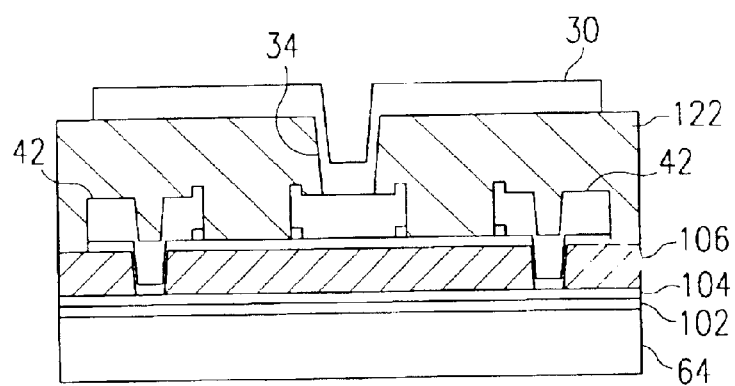

Referring to FIG. 10, a mirror metal layer, comprising an aluminum alloy and having reflective properties, is then deposited to a thickness of about 4000 angstroms. This layer forms both the mirror support post 34 and the mirror 30. A masking oxide layer is then deposited onto the mirror layer, and patterned in the shape of the mirrors. The mirror layer is then etched to form the mirror 30 and support post 34. The masking oxide is typically left in place while the wafer is subsequently processed and sawed.

Figure 11:
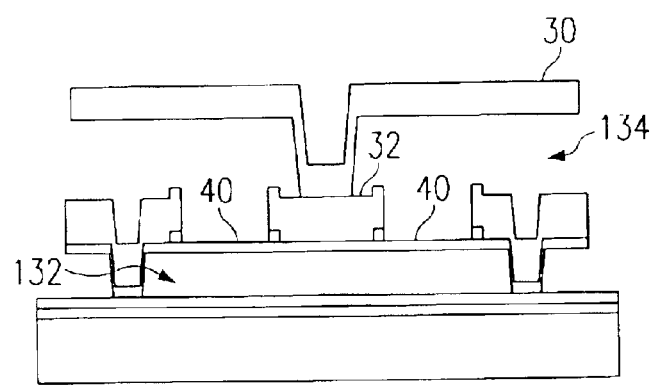

Referring to FIG. 11, the chips are placed in an etching chamber, where the masking oxide and both spacer layers 106 and 122 are etched away. This leaves the hinge air gap under hinges 40 and yoke 32, as well as a mirror air gap 134 under mirror 30.

Other Embodiments

Although the present invention has been described in detail, it should be understood that various changes, substitutions, and alterations can be made hereto without departing from the spirit and scope of the invention as defined by the appended claims.

What is claimed is:

1. A method of constructing an array of mirrors, such that each mirror is individually rotateable into at least two states, comprising the steps of:

constructing a metallization layer for electrostatically addressing the mirrors of the array;

constructing a yoke layer in a plane separate from the plane of the metallization layer, the yoke layer comprising at least a yoke for supporting each mirror, and a hinge for supporting the yoke over the metallization layer, wherein the hinge permits the yoke to tilt in response to electrostatic addressing, and further comprising a pair of springtips at each leading edge of the yoke, the springtips operable to land on the metallization layer when the mirror is tilted; and constructing a mirror layer in which the mirrors are fabricated;

increasing the spacing between the springtips of each springtip pair and the height of the yoke for optimal performance;

wherein the optimal performance provides increased clearance between the addressing circuitry first portion and the leading edge of the yoke without significant comprise to electrostatic performance.

2. The method of claim 1, further comprising the step of increasing the span between the base of each springtip and the leading edge for providing said optimal performance.

3. The method of claim 1, further comprising the step of increasing the width of the leading edge.

4. The method of claim 1, further comprising the step of fabricating a rounded hinge support post on the metallization layer.

5. The method of claim 1, wherein the hinges are generally bar shaped.

6. The method of claim 1, wherein yoke layer further comprises a mirror address electrode at each corner of the mirror, whose area is decreased.

7. The method of claim 1, wherein the metallization layer has a metal area under the corner of each mirror that is decreased.

8. The method of claim 1, wherein the springtips are extended further under the corner of the mirror, for providing said optimal performance.

* * * * *